(12) United States Patent
Ohno et al.

(10) Patent No.: US 6,961,511 B2
(45) Date of Patent: Nov. 1, 2005

(54) RECEIVING APPARATUS AND CONTROL METHOD THEREFOR

(75) Inventors: Tomoyuki Ohno, Kanagawa (JP); Nobuhiro Hoshi, Kanagawa (JP); Nobuharu Ichihashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 09/817,343

(22) Filed: Mar. 27, 2001

(65) Prior Publication Data

US 2001/0028782 A1    Oct. 11, 2001

(30) Foreign Application Priority Data

Mar. 29, 2000  (JP) .............................. 2000-092045

(51) Int. Cl.[7] .......................... H04N 5/91; H04N 7/08

(52) U.S. Cl. ......................................... 386/83; 386/92

(58) Field of Search .............................. 386/66, 83, 92, 386/124, 125, 109, 111, 112, 27, 33, 105, 386/106, 45, 40; 725/86, 87, 101

(56) References Cited

U.S. PATENT DOCUMENTS 6,226,444 B1 * 5/2001 Goldschmidt Iki et al. ... 386/83

FOREIGN PATENT DOCUMENTS

EP    0776127 A2 *  5/1997
EP    0782332 A2 *  7/1997

* cited by examiner

*Primary Examiner*—Robert Chevalier
(74) *Attorney, Agent, or Firm*—Fitzpatrick, Cella, Harper & Scinto

(57) ABSTRACT

The tuner unit of a digital broadcast receiving apparatus receives a digital broadcast and generates a data stream from a digital broadcast signal having a desired modulation frequency. A data stream of a digital broadcast is also input from an external digital broadcast receiving apparatus via an external I/F. A stream switching unit and demultiplexer play back the content on a desired channel, contained in the two data streams, on an image display unit in real time, and at the same time, store the content on the other channel, contained in the other data stream, in a storage unit. This makes it possible to watch one of at least two programs with different modulation frequencies while recording the other program.

22 Claims, 10 Drawing Sheets

FIG. 3

| TABLE NAME | PID VALUE | EXPLANATION OF TABLE |
|---|---|---|
| PAT | 0x0000 | LINKING BETWEEN PROGRAM NUMBERS, PMTS, AND PIDS |
| PMT | DESIGNATED BY PAT | DESIGNATION OF PIDS OF PACKETS CONSTITUTING PROGRAM |
| NIT | 0x0010 | PHYSICAL NETWORK PARAMETERS; LIST OF BROADCAST SERVICES IN NETWORK |
| CAT | 0x0001 | LINKING BETWEEN PIDS AND PACKETS FOR SENDING INFORMATION SUCH AS SUBSCRIPTION INFORMATION IN PAY BROADCAST |

FIG. 9A

| DESCRIPTOR TAG | DESCRIPTOR LENGTH | NETWORK NAME (CHARACTER; CODE) |
|---|---|---|
| '0x40' | | |
| 8 | 8 | 8×N |

FIG. 9B

| DESCRIPTOR TAG | DESCRIPTOR LENGTH | FREQUENCY | ORBIT | EAST LONGITUDE /WEST LONGITUDE FLAG | POLARIZATION | MODULATION | SYMBOL RATE | INTERNAL CODE |
|---|---|---|---|---|---|---|---|---|
| '0x43' | | | | | | | | |
| 8 | 8 | 32 | 16 | 1 | 2 | 5 | 28 | 4 |

FIG. 9C

| DESCRIPTOR TAG | DESCRIPTOR LENGTH |
|---|---|
| '0x41' | |
| 8 | 8 |

| SERVICE IDENTIFICATION | SERVICE FORM TYPE |
|---|---|
| 16 | 8 |

← REPETITION →

RECEIVING APPARATUS AND CONTROL METHOD THEREFOR

FIELD OF THE INVENTION

The present invention relates to an apparatus for receiving a digital TV broadcast and displaying or recording/playing back the broadcast.

BACKGROUND OF THE INVENTION

Recently, image digital processing techniques have increasingly been applied to practical use. In general, digitization of video signals results in an enormous amount of information, and hence such information is difficult to transmit or record without compression in terms of communication rate, cost, and the like. Image compression techniques are indispensable for, for example, transmitting or recording digital video signals; various standardization techniques have been examined and put into practice. As techniques for moving pictures, MPEG (Moving Picture Experts Group) schemes have been standardized.

The MPEG-2 scheme, in particular, has become most popular as a standardization scheme for image compression, and are used for digital TV broadcasts in the USA, Europe, and Japan. In addition, with advances in digitization and image compression techniques, deterioration in transmission and recording can be reduced, and high-quality playback images can be obtained.

As digitization techniques advance as described above, with regard to TV broadcasts, multi-channel broadcasts realized by effectively using frequency bands, e.g., satellite digital TV broadcast services, are expected in place of analog broadcasts. With the popularization of digital TV broadcasts, there may be cases where broadcast signals are recorded, and the recorded signals are played back at desired points of time, thereby allowing users to watch programs at the desired times. In this case, a function and device which receive digital broadcast signals and directly record them are required.

In general, however, a digital TV broadcast receiving apparatus having a digital broadcast signal recording function of this type has only one tuner unit. For this reason, with regard to programs on channels which are modulated with the same RF and transmitted, this apparatus can display a program on a given channel in real time, and at the same time, can record a program on another channel to allow a user to playback the recorded program afterward so as to display and watch it. However, with regard to programs on two channels which are modulated with different RFs (e.g., different modulation frequencies are used depending on transponders in the case of satellite digital TV broadcasts) and transmitted, the apparatus cannot simultaneously display a program on one channel in real time and record a program on the other channel to allow the user to playback the recorded program afterward so as to display and watch it.

Such a problem can be simply solved by providing a plurality of tuner units for a receiving apparatus. However, it is not desirable to provide a plurality of tuner units for one digital TV broadcast receiving apparatus with a digital broadcast signal recording function from the viewpoint of increases in the cost and volume of the apparatus.

SUMMARY OF THE INVENTION

The present invention has been made in consideration of the above problem, and has as its object to watch one of at least two programs with different modulation frequencies while recording the other program by allowing the use of other digital broadcast receiving apparatuses.

In order to achieve the above object, according to the present invention, there is provided a digital broadcast receiving apparatus comprising generating means for receiving a digital broadcast and generating a data stream from a digital broadcast signal having a desired modulation frequency, input means for inputting a data stream based on a digital broadcast from an external digital broadcast receiving apparatus, playback means for playing back a content of a channel contained in one of the data streams obtained by the generating means and input means, and storage means for storing a content of a channel contained in the data stream other than the data stream to be played back by the playback means in a data storage medium.

In addition, in order to achieve the above object, according to another aspect of the present invention, there is provided a digital broadcast receiving apparatus having generating means for receiving a digital broadcast and generating a data stream from a digital broadcast signal having a desired modulation frequency, comprising notification means for notifying information of a channel that can be received in accordance with a request from an external digital broadcast receiving apparatus, control means for controlling the generating means in accordance with a request from the external digital broadcast receiving apparatus so as to generate a data stream from a digital broadcast signal having a modulation frequency containing a designated channel, and output means for outputting the data stream containing the designated channel, generated by the generating means, to the external digital broadcast receiving apparatus.

Furthermore, according to the present invention, there is provided a digital broadcast receiving system in which a plurality of digital broadcast receiving apparatuses are connected to each other via communication means so as to be able to communicate with each other, comprising generating means for receiving a digital broadcast and generating a data stream from a digital broadcast signal having a desired modulation frequency in a first digital broadcast receiving apparatus, input means for allowing the first digital broadcast receiving apparatus to input a data stream based on a digital broadcast from an external digital broadcast receiving apparatus via the communication means, playback means for allowing the first digital broadcast receiving apparatus to play back in real time a content of a channel contained in one of the data streams respectively obtained by the generating means and input means, and storage means for allowing the first digital broadcast receiving apparatus to store in a data storage medium a content of a channel contained in the data stream other than the data stream to be played back by the playback means.

Moreover, in order to achieve the above object, according to the present invention, there is provided a receiving apparatus comprising reception means for receiving a digital broadcast signal and generating a first data stream in accordance with the digital broadcast signal, input means for inputting a second data stream from an external receiving apparatus, selection means for selectively outputting the first data stream generated by the receiving means and the second data stream input by the input means, and control means for detecting a channel that can be received by the external receiving apparatus and controlling selecting operation of the selection means in accordance with the detection result.

According to the present invention, there is also provided a control method for the above apparatus and system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view for explaining PSI information;

FIG. 9A is a view showing the structure of a network descriptor;

FIG. 9B is a view showing the structure of a satellite distribution system descriptor;

FIG. 9C is a view showing the structure of a service list descriptor; and

DETAILED DESCRIPTION OF THE PREFERRED EMBODIMENT

A preferred embodiment of the present invention will now be described in detail in accordance with the accompanying drawings.

A digital TV broadcast receiving apparatus with a digital broadcast signal recording function according to this embodiment solves the above problem by performing bus connection or network connection to other digital broadcast receiving apparatuses and the like and transmitting/receiving information for the selection of programs, video data, and audio data through the connections.

Figure 1:
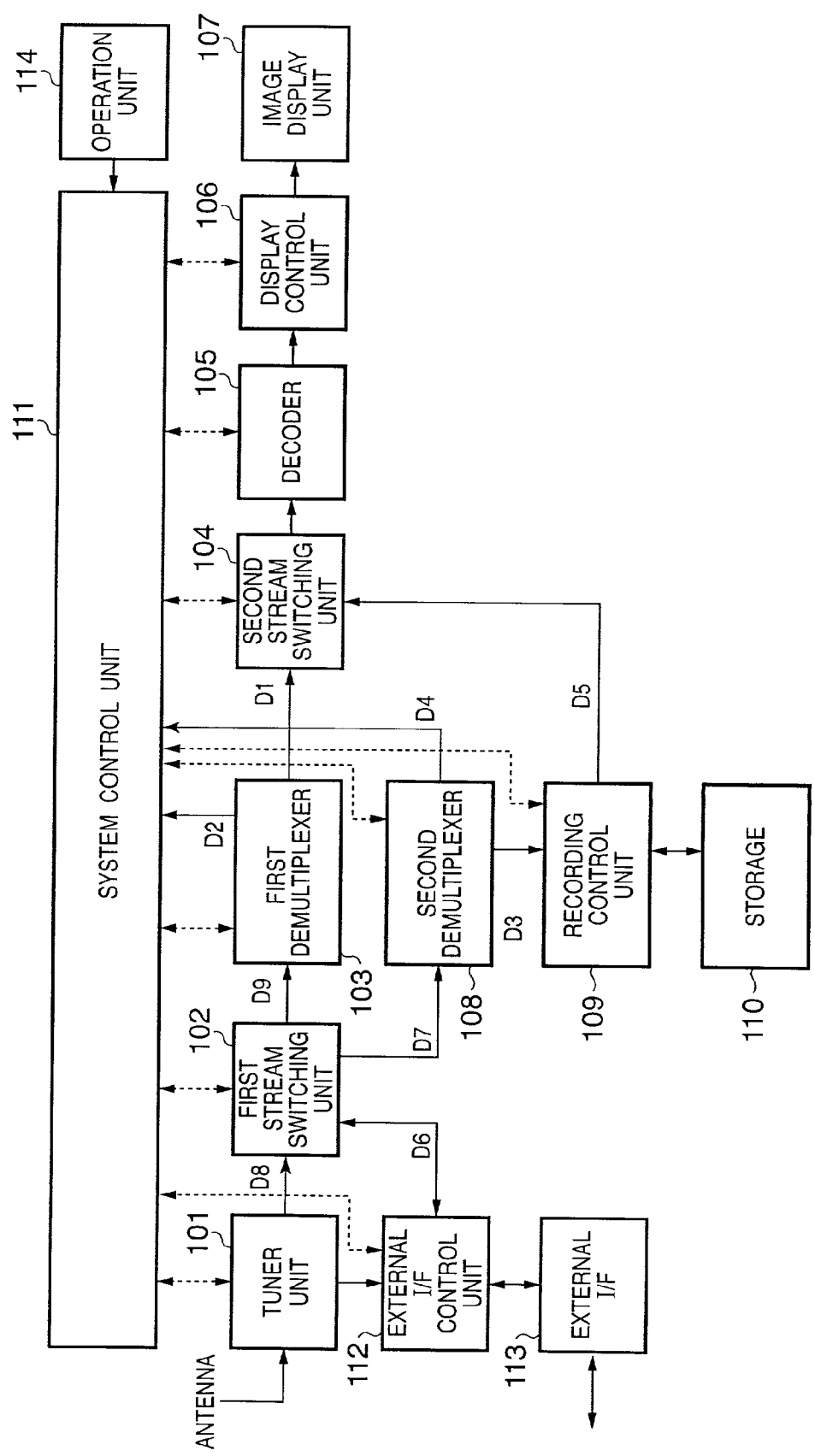
FIG. 1 is a block diagram showing the arrangement of a digital TV broadcast receiving apparatus with a digital broadcast signal recording function according to this embodiment.

The digital TV broadcast receiving apparatus with the digital broadcast signal recording function according to this embodiment will be described below with reference to the accompanying drawings. FIG. 1 is a block diagram showing the arrangement of the main part of the digital TV broadcast receiving apparatus with the digital broadcast signal recording function according to this embodiment. Referring to FIG. 1, reference numeral 101 denotes a tuner unit; 102, a first stream switching unit; 103, a first demultiplexer; 104, a second stream switching unit; 105, a decoder; 106, a display control unit; 107, an image display unit; 108, a second demultiplexer; 109, a recording control unit; 110, a storage; 111, a system control unit; 112, an external I/F control unit; and 113, an external I/F.

Referring to FIG. 1, the tuner unit 101 receives a signal from an antenna and outputs a signal D8 as a transport stream (to be referred to as a TS hereinafter) upon performing demodulation and error correction of the received data. Note that the TS will be described later with reference to FIG. 2. The first stream switching unit 102 performs switching to output the signal D8 as a TS from the tuner unit 101 and a signal D6 as a TS sent from the external I/F control unit 112 (to be described later) to the first or second demultiplexer 103 or 108. A stream to be displayed in real time is supplied as a signal D9 from the first stream switching unit 102 to the first demultiplexer 103. A stream to be recorded is supplied as a signal D7 from the first stream switching unit 102 to the second demultiplexer 108.

Figure 2:
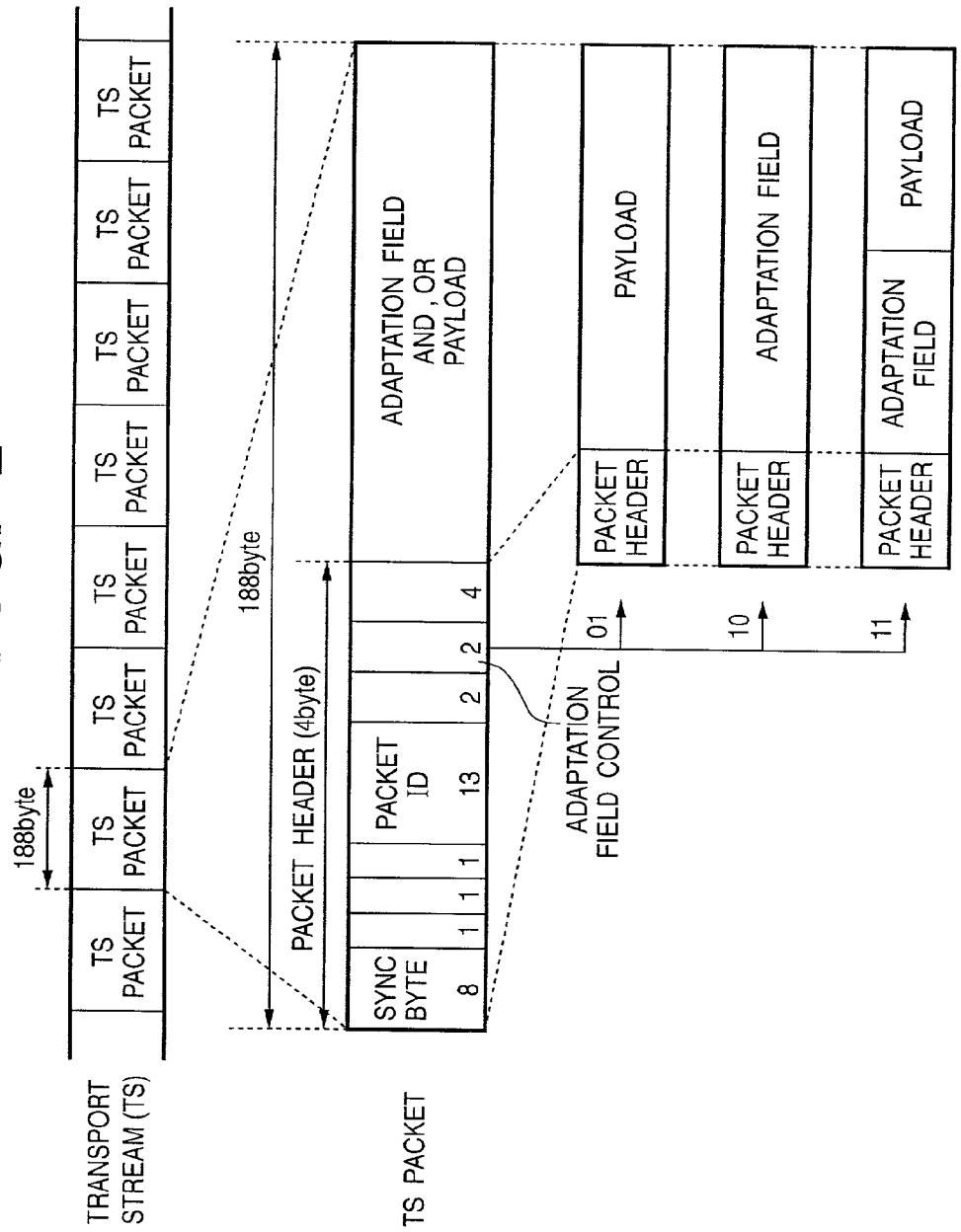
FIG. 2 is a view showing the structure of a transport stream.

FIG. 2 is a view showing the format of a TS output from the tuner unit 101. The TS is formed by time-division multiplexing of 188-byte TS packets. A 13-bit packet ID (to be referred to as a PID hereinafter) is added to each TS packet. The first and second demultiplexers 103 and 108 extract desired video data D1 for real-time display, video data D3 for recording, audio data (not shown), PSI data D2 and D4, and SI data (not shown), which are identified by referring to the above PIDs, from TS data obtained by time-division multiplexing of packets of video and audio data corresponding to a plurality of channels and information for channel selection (e.g., PSI (Program Specific Information) and SI (Service Information) defined in the standard specifications "Program Arrangement Information Used for Digital Broadcasting" proposed by "IEC 13818-1 MPEG2 SYSTEM" and Association of Radio Industries and Businesses (commonly called ARIB) and also defined by broadcasting companies and the like). The video data D1 and D3 (which are encoded by MPEG2 or the like in the case of digital TV broadcasting), each corresponding to one channel, extracted by the first and second demultiplexers 103 and 108 are respectively sent to the second stream switching unit 104 and recording control unit 109. The PSI data D2 and D4 are sent to the system control unit 111.

The PSI data D2 and D4 sent to the system control unit 111 are used to extract the TS packets of program data on desired channels from the time-division multiplex TS data. As shown in FIG. 2, one TS packet consists of a 4-byte packet header and 184-byte adaptation field or payload. A packet header is mainly comprised of an 8-bit "sync byte (47 h)", the above 13-bit "Packet ID (PID)" for identifying each packet as video or audio data, information for channel selection, or the like, and 2-bit "adaptation field control" indicating whether 184 bytes other than the above packet header are formed by only an adaptation field, only a payload, or an adaptation field and payload.

To receive a program on a desired channel, data (tables) called a PAT (Program Association Table), PMT (Program Map Table), NIT (Network Information Table), and CAT (Conditional Access Table), which are the PSI information described above, are required. ID numbers based on the above PIDs are assigned to all TS packets forming these tables. FIG. 3 shows the assignment of PID values in PSI information and a table for explaining them (for the NIT, the PID value defined in ARIB described above is shown).

The PIDs of video and audio TS packets required for a program on a given channel are described in a PMT, and the PID of the PMT is described in a PAT. Although not described in detail here, a CAT contains "key information" for descrambling for limited reception of a pay broadcast or the like. An NIT contains physical information about a transmission path for a broadcast (e.g., a network, satellite, or transponder) and the channels contained in one TS (e.g., in the case of satellite broadcasting, one TS is transmitted by one transponder, and hence its modulation frequency or the like is described in the table). The PIDs of video and audio TS packets and the like on a selected channel are obtained from these tables, and the TS packets containing these PIDs are extracted, thereby receiving and acquiring the TS packets of the desired video and audio data.

Figure 4:
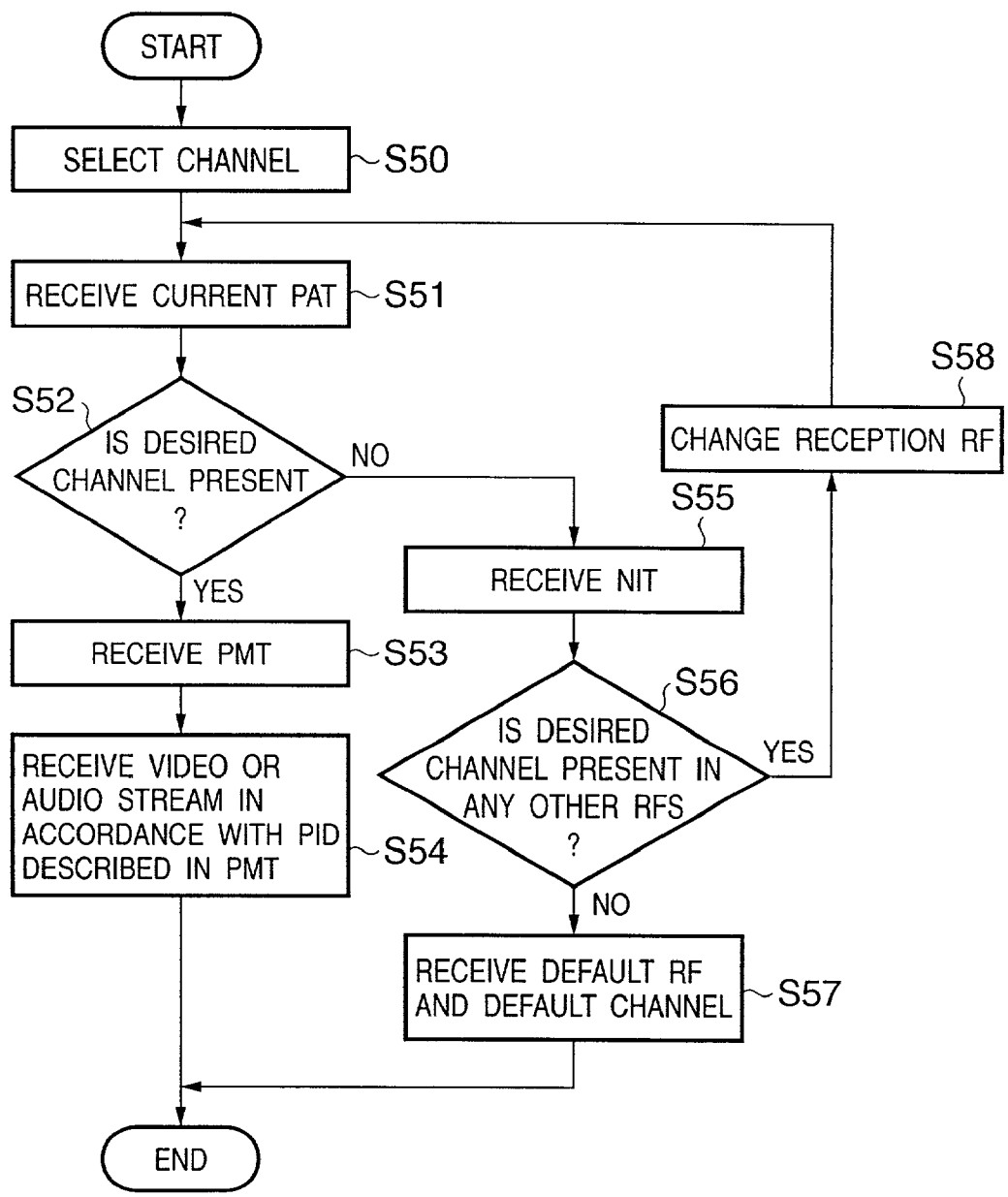
FIG. 4 is a flow chart for explaining a general control procedure for receiving a predetermined channel.

FIG. 4 is a flow chart showing an example of how a program on a desired channel is received in the tuner unit 101, first demultiplexer 103, second demultiplexer 108, and system control unit 111.

In step S50, a user selects a channel number by operating an operation unit 114 such as a remote controller with which the digital TV broadcast receiving apparatus with the digital broadcast signal recording function according to this embodiment is equipped. When a channel number is selected, the first demultiplexer 103 extracts a PAT from the TS currently received by the tuner unit 101 in step S51. In step S52, the system control unit 111 checks whether the desired channel number selected in step S50 is present in the currently received TS.

If YES in step S52, the flow advances to step S53 to acquire the PID of a PMT corresponding to the channel, which is described in the received PAT, and receive a PMT to which the PID is added. The acquired PMT contains the PID values of video and audio TS packets required for the program. The first or second demultiplexer 103 or 108 extracts TS packets containing these PIDs (step S54), thereby allowing the user to watch or record the program.

If it is determined in step S52 that the desired channel program is not present, the flow advances to step S55 to receive an NIT. In step S56, it is checked whether the target channel number (selected in step S50) is present in any other modulation frequencies (RF (Radio Frequency)). If YES in step S56, the flow advances to step S58 to change the reception frequency (reception RF) of the tuner unit 101 and extract a PAT corresponding to the resultant reception frequency. If the selected channel does not exist in any other RFs, the default RF and channel set in the receiving apparatus are generally received (step S57).

The following is a description of display or recording of the programs based on the TS packets extracted by the first and second demultiplexers 103 and 108 in the above manner and playback of the recorded data.

When the real-time display video data D1 extracted by the first demultiplexer 103 is to be displayed, the second stream switching unit 104 selects the real-time video data D1 and outputs it to the decoder 105 to be decoded. The decoded data is sent to the display control unit 106 and displayed on the image display unit 107. The recording video data D3 extracted by the second demultiplexer 108 is sent to the recording control unit 109, which controls the storage 110 to record the recording video data D3. As the storage 110, a magnetic disk, optical disk, magnetic tape, semiconductor memory, or the like is used.

When video data recorded on the storage 110 is to be played back, the recording control unit 109 reads out the desired data from the storage 110 and outputs it as playback video data D5 to the second stream switching unit 104. When video data recorded on the storage 110 is to be played back, the second stream switching unit 104 selects the playback video data D5 instead of the real-time display video data D1, and outputs it to the decoder 105 to be decoded. The decoded data is sent to the display control unit 106. As a consequence, a picture is displayed on the image display unit 107.

In the above manner, the PSI data D2 and D4 sent to the system control unit 111 are processed. The resultant data are modulated with the same RF and sent, thereby displaying or recording the programs on the channel selected by the first and second demultiplexers 103 and 108 and playing back the recorded data.

The following is a description of a case where when programs on two channels which are modulated with different RFs are received, the program on one channel is displayed in real time, and at the same time, the program on the other channel, which is multiplexed on an RF different from that on the above channel, is recorded to be played back and displayed afterward.

Figure 5:
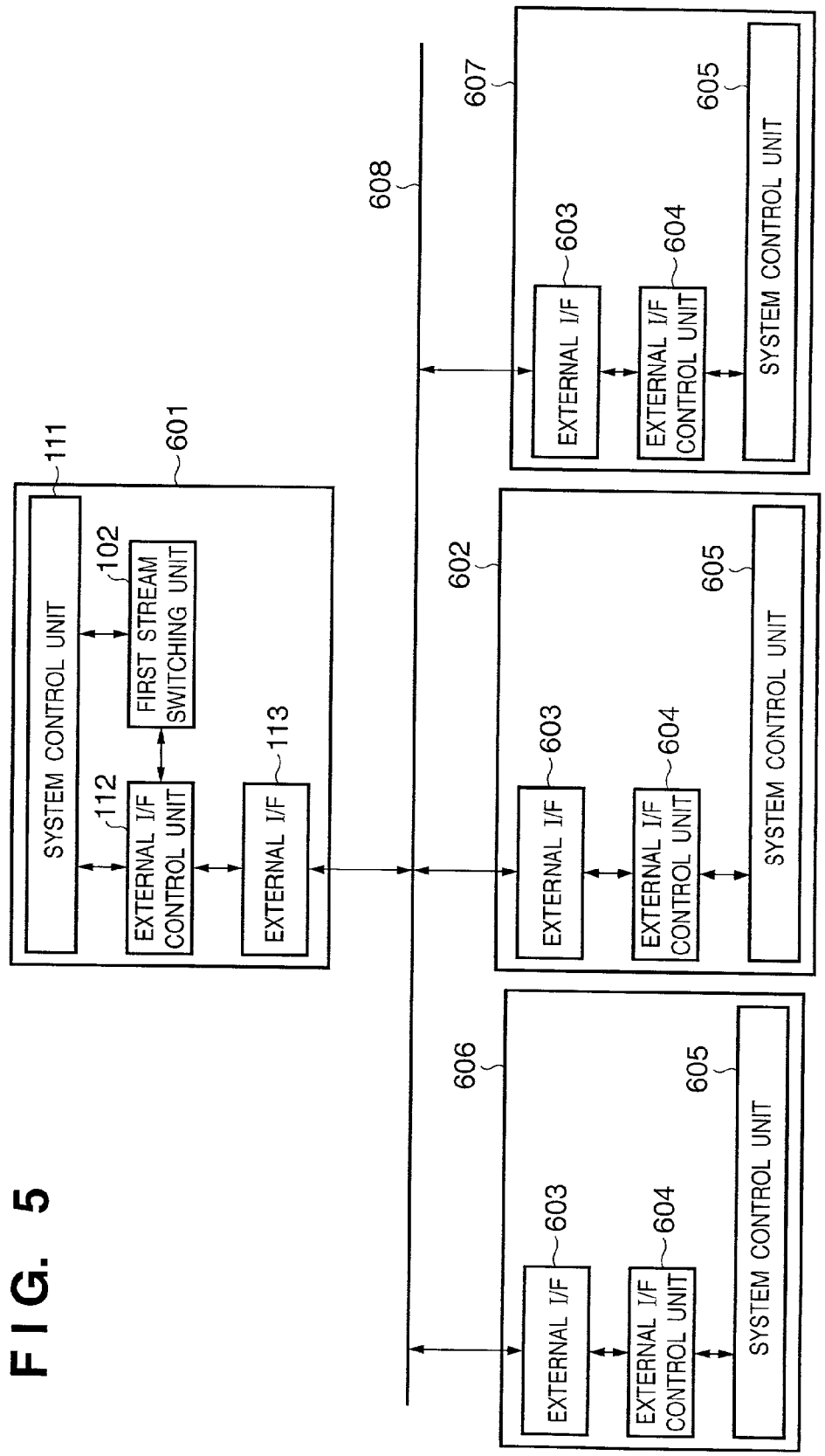
FIG. 5 is a schematic view showing how a plurality of digital TV broadcast receiving apparatuses are connected to each other via a bus.

FIG. 5 is a view conceptually showing how the digital TV broadcast receiving apparatus with the digital broadcast signal recording function is connected to other digital TV broadcast receiving apparatuses via the external I/F 113 by bus connection (or network connection). Referring to FIG. 5, reference numeral 601 denotes the digital TV broadcast receiving apparatus with the digital broadcast signal recording function shown in FIG. 1, in which the first stream switching unit 102, system control unit 111, external I/F control unit 112, and external I/F 113 are identical to those shown in FIG. 1. Reference numerals 602, 606, and 607 denote digital TV broadcast receiving apparatuses, in each of which an external I/F 603 and external I/F control unit 604 respectively have the same functions as those of the external I/F 113 and external I/F control unit 112; 605, a system control unit in each of the digital TV broadcast receiving apparatuses 602, 606, and 607; and 608, a connection bus for connecting the apparatuses 601, 602, 606, and 607 to each other.

Figure 6:
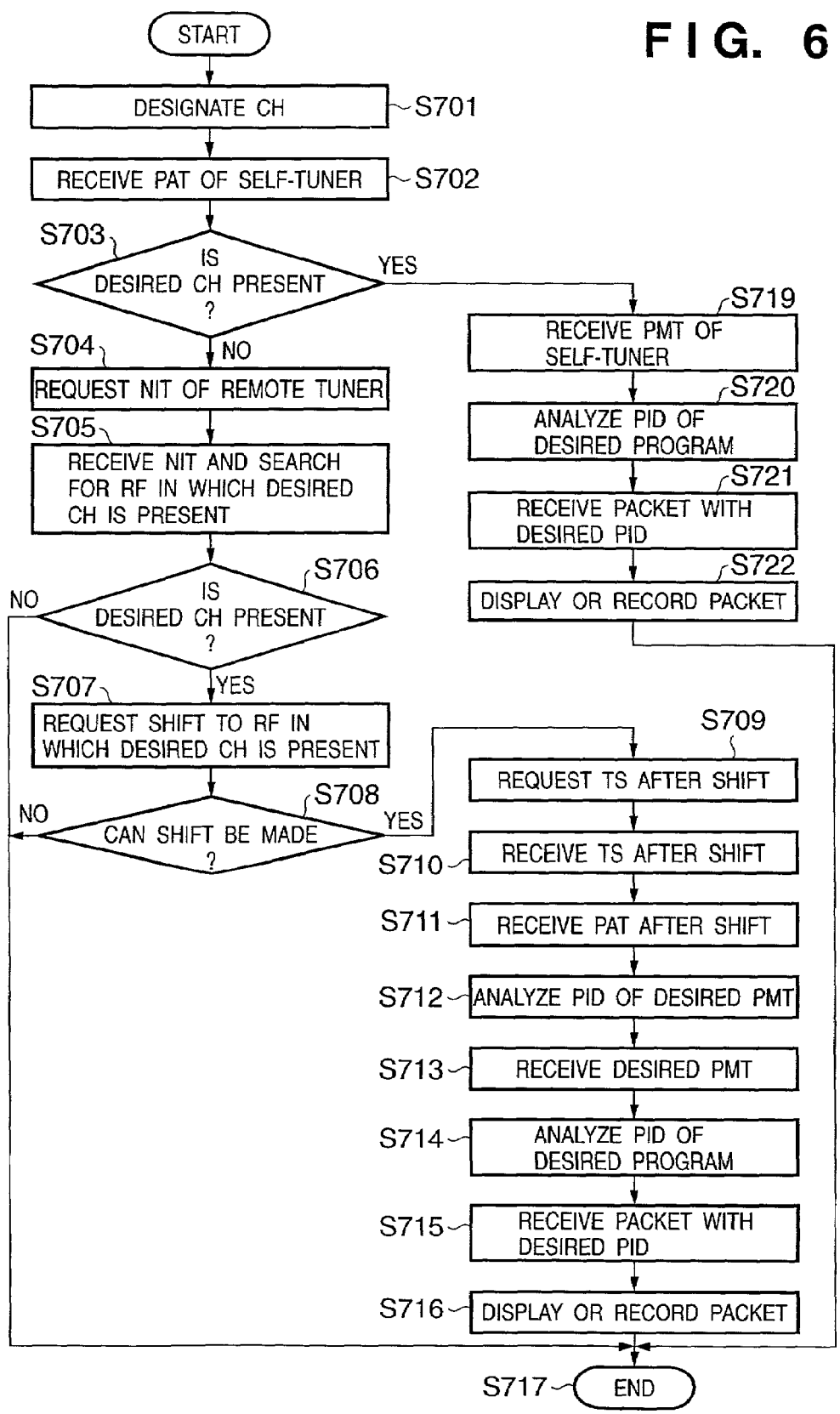
FIG. 6 is a flow chart for explaining data transmission/reception control according to this embodiment.

FIG. 6 is a flow chart showing a control procedure for allowing the digital TV broadcast receiving apparatus with the digital broadcast signal recording function according to this embodiment to display one of the two programs modulated with different RFs while recording the other program. In this embodiment, the digital TV broadcast receiving apparatus with the digital broadcast signal recording function according to the embodiment (to be referred to as a self-tuner hereinafter) is connected to other digital TV broadcast receiving apparatuses (to be referred to other tuners hereinafter) through the external I/Fs and connection bus 608. One of the two programs modulated with different RFs is acquired by the tuner unit 101 in the self-tuner, and the other program is acquired by a remote tuner, thereby displaying one of the two programs in real time while recording the other program to be played back afterward.

Data transmission/reception control according to this embodiment by which one of the programs modulated with different RFs can be displayed while the other program is recorded will be described below with reference to FIGS. 6 to 9C. Assume that in the following case, channel numbers 1 to 4 are multiplexed on the same modulation frequency (RF1), while channels 5 to 8 are multiplexed on a modulation frequency (RF2) different from that for channel numbers 1 to 4. Assume also that a program with program number 2 is currently recorded while a program with channel number 1 is displayed (watched) in real time in the self-tuner 601, and the user has given an instruction to change the current program to a program with channel number 5 to be displayed (watched) in real time.

In step S701 in FIG. 6, the system control unit 111 detects an instruction to display the program with channel number 5 when the user operates the operation unit 114 such as a remote controller in FIG. 1 with which the self-tuner is equipped. In step S702, the self-tuner 601 receives the PAT multiplexed on the currently received RF1 via the tuner unit 101, first stream switching unit 102, and first demultiplexer 103. At this point of time, the first stream switching unit 102 has selected the signal D8 as a TS from the tuner unit 101 and transmitted it as the signal D9 to the first demultiplexer 103.

In step S703, it is checked from the received PAT whether the desired channel is present in the currently received RF1. In a channel change pattern other than that described in this embodiment, e.g., a change from channel number 1 to channel number 3, since these channels exist in the same RF1, the flow advances from step S703 to step S719.

Extraction processing for a packet for display is performed in steps S719 to S721. More specifically, the system control unit 111 receives the PMT of the self-tuner in step S719, and analyzes it to obtain the PID value of the program on the desired channel in step S720. In step S721, the desired packet is received. Thereafter, in step S722, the received packet is displayed.

As described above, when the program with channel number 2 is recorded while the program with channel number 1 currently multiplexed on the RF1 is watched, channel number 5 to which the current channel number is to be changed is multiplexed on the RF2 but does not exist on the RF1. In this case, since the program with channel number 2 is being recorded, the RF cannot be changed. The flow therefore advances from step S703 to step S704, in which the self-tuner 601 requests the other tuners 602, 606, and 607, connected to the connection bus 608, via the system control unit 111, external I/F control unit 112, and external I/F 113 to transmit the NITs received by the respective tuners to the self-tuner. This request is simultaneously sent to the other tuners 602, 606, and 607 via the connection bus 608. In accordance with this request, each of the other tuners 602, 606, and 607 sends out the received NIT to the self-tuner 601 via the system control unit 605, external I/F control unit 604, and external I/F 603.

Figure 7:
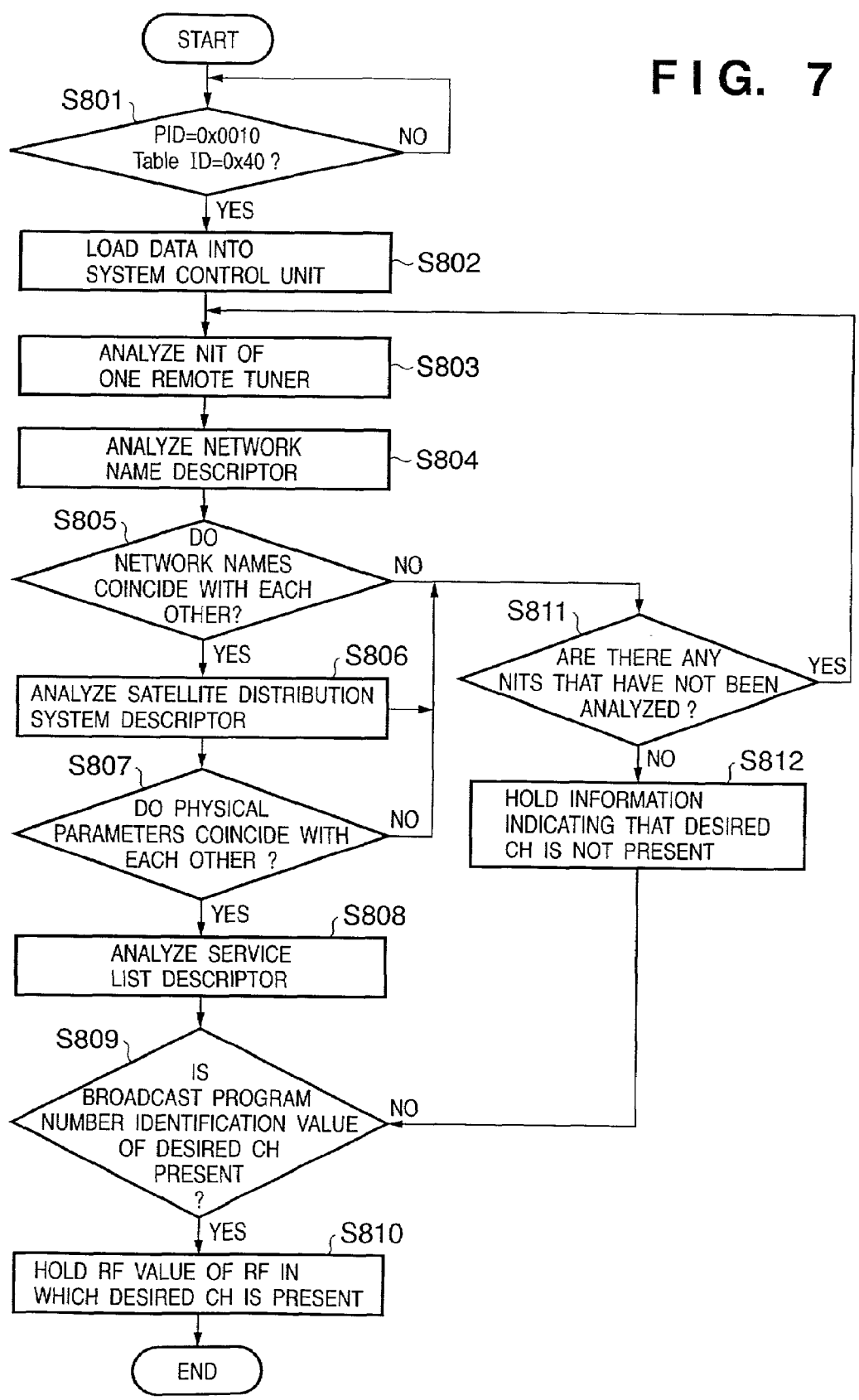
FIG. 7 is a flow chart showing analysis control on the NIT received from a remote tuner in this embodiment.
Figure 8:
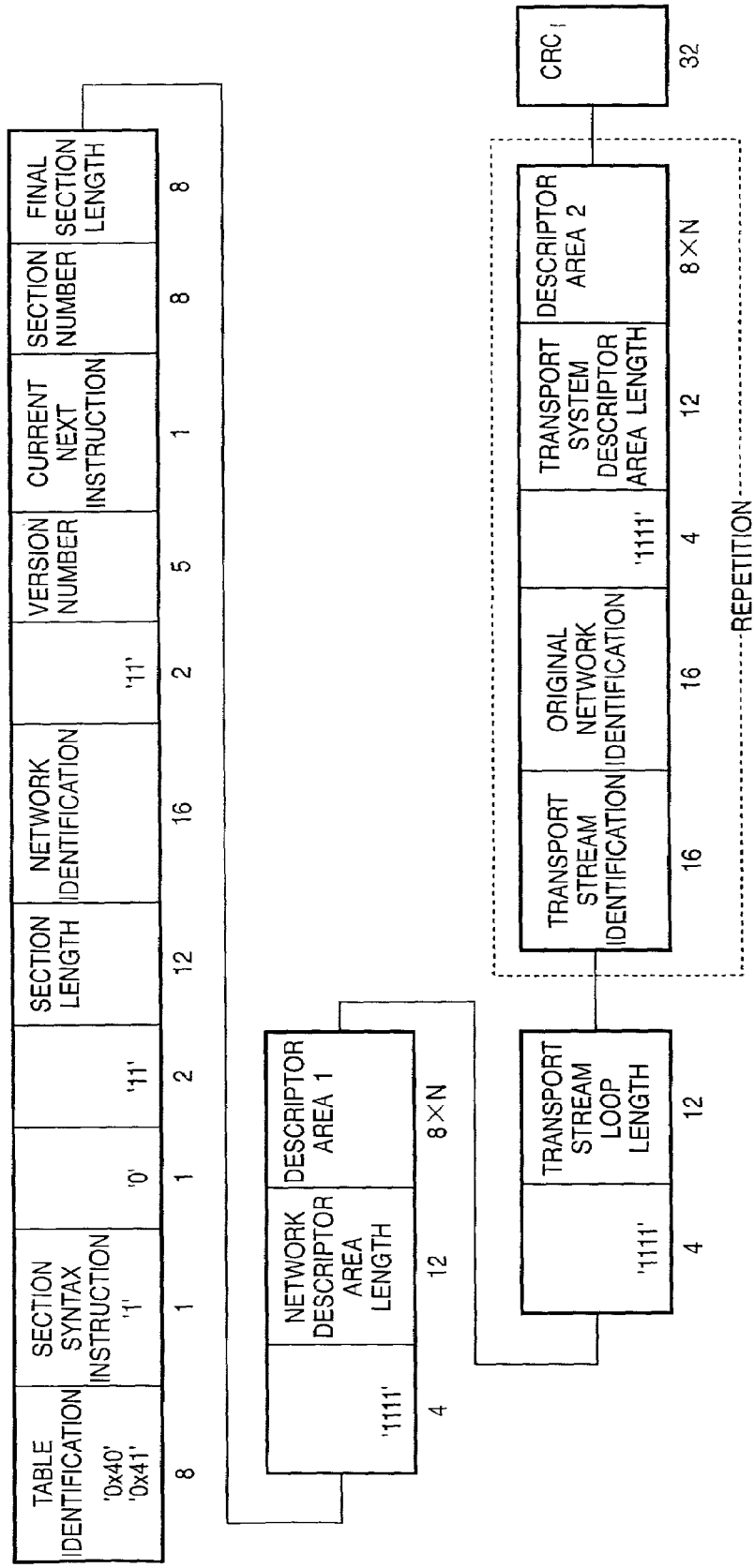
FIG. 8 is a view showing the table structure of an NIT.

In step S705, the system control unit 111 of the self-tuner analyzes the respective NITs received from the other tuners to search for an RF on which desired channel number 5 is multiplexed. FIG. 7 is a flow chart for explaining a control procedure for search processing in step S705. FIG. 8 is a view showing the table structure of an NIT defined in the standard specifications "Program Arrangement Information Used for Digital Broadcasting" (ARIB STD-B10) in ARIB described above. FIGS. 9A, 9B, and 9C are views respectively showing the descriptor structures of a network name descriptor, satellite distribution system descriptor, and service list descriptor defined in standard specifications "Program Arrangement Information Used for Digital Broadcasting" (ARIB STD-B10) in ARIB described above.

In step S801 in FIG. 7, the self-tuner 601 checks whether the PID (the value of the 13-bit Packet ID in FIG. 2) and Table ID (the value of the 8-bit table identification at the head in FIG. 8) of the NIT received via the external I/F 113 and external I/F control unit 112 are 0x0010 and 0x40, respectively, thereby checking whether the transmitted NIT is the NIT of the self-network of a remote tuner that has transmitted it. In step S802, the system control unit 111 stores the NIT from the external I/F control unit 112 in a memory or the like in the system control unit 111. If, for example, the PID and Table ID of the NIT transmitted from the remote tuner are 0x0010 and 0x41, respectively, since the NIT is the NIT of a network other than that of the remote tuner that has transmitted the NIT, the NIT need not be stored.

In step S803, the NIT of a given one of the other tuners is selected from the NITS of the other tuners which are received in the above manner. In step S804, the network descriptor of the selected NIT is analyzed. FIG. 9A shows an example of the data structure of a network descriptor. The tag value of the network descriptor is 0x40. This descriptor is shown in descriptor area 1 of the table structure of the NIT shown in FIG. 8. In this descriptor, a physical network name, e.g., "CS digital broadcasting" or "BS digital broadcasting", is encoded and described. If it is determined in step S805 that the network name in the descriptor differs from the network name described in the NIT of the self-tuner, since only a TS different from the TS from the remote tuner which has transmitted the received NIT can receive, analysis of this NIT is terminated. It is then checked in step S811 whether there is any NIT that has not been analyzed. If YES in step S811, the flow advances to step S803 to select the NIT from the remote tuner. If NO in step S811, the flow advances to step S812 to store information indicating the absence of the desired channel in the memory. This processing is then terminated, and the flow advances to step S706 in FIG. 6.

If YES in step S805, the flow advances to step S806 to analyze a satellite distribution system descriptor. FIG. 9B shows the structure of a satellite distribution system descriptor. The tag value of the satellite distribution system descriptor is 0x43, and this descriptor is shown in descriptor area 2 in the table structure of the NIT shown in FIG. 8. This descriptor indicates physical parameters for each TS multiplexing in a physical network. For example, the orbit of a satellite, the direction of polarization, and a modulation method are encoded and described in this descriptor. If it is determined in step S807 that the physical parameters in the descriptor do not coincide with the physical parameters described in the NIT of the self-tuner, the analysis of this NIT is terminated, and the flow advances to step S811.

If it is determined in step S807 that the physical parameters coincide with each other, the flow advances to step S808 to analyze a service list descriptor. FIG. 9C shows the structure of a service list descriptor. The tag value of the service list descriptor is 0x41. This descriptor is shown in descriptor area 2 in the table structure of the NIT shown in FIG. 8. In this descriptor, a list of services in each TS is described. In step S809, it is checked whether the broadcast program number identification value of the desired channel is present. More specifically, in step S809, it is checked whether the 16-bit service identification value shown in FIG. 9C coincides with the 16-bit broadcast program number identification value described in the PMT of the desired channel which is referred to. If YES in step S809, the flow advances to step S810 to store the RF in which the desired channel exists in the memory. This processing is then terminated. If NO in step S809, the analysis of this NIT is terminated, and the processing in step S811 is performed. If it is determined in step S811 that no NIT is present, which has not been analyzed, the flow advances to step S812 to store information indicting the absence of the desired channel in the memory. This processing is then terminated.

When the processing described with reference to FIG. 7 is completed, the flow advances from step S705 to step S706. In step S706, it is checked on the basis of the processing results held in the memory in steps S810 and S812 whether there is any tuner that can receive the RF on which the desired channel is multiplexed. If NO in step S706 (the processing in step S812 is finally performed in the processing in step S705), it is determined that the change to desired channel number 5 cannot be made, and corresponding information is displayed on the image display unit 107.

The processing is then terminated. In this case, the program based on the TS from the tuner unit 101 is displayed without any change. If YES in step S706 (the processing in step S810 is finally performed in the processing in step S705), the self-tuner sends a request to shift to that RF to a remote tuner (in this embodiment, the remote tuner 602 in FIG. 5), which has transmitted the NIT in which the RF is present, via the external I/F control unit 112 and external I/F 113 in step S707.

Upon reception of this request, the remote tuner 602 in FIG. 5 checks in its system control unit 605 whether a shift to the requested RF can be made. If this shift can be made, the remote tuner 602 notifies the self-tuner 601 via the external I/F control unit 604 and external I/F 603 that the shift can be made. If the shift to the RF cannot be made in the remote tuner 602 as in a case where a program on a channel multiplexed on an RF other than the requested RF is being watched, the remote tuner 602 notifies the self-tuner 601 that the shift cannot be made.

In step S708, the self-tuner checks in the system control unit 111 in accordance with the notification from the remote tuner 602 whether the remote tuner 602 can shift to the RF. If NO in step S708, the processing is terminated. Obviously, in this case, the processing in steps S705 to S707 may be repeated for other tuners except for the remote tuner to further search for a remote tuner which can receive the desired channel. In step S709, the system control unit 111 of the self-tuner 601 sends a request for a TS after the RF shift to the remote tuner 602. The remote tuner 602 changes the reception RF in accordance with the request from the self-tuner 601, and transmits the TS on the requested RF to the self-tuner 601 via the external I/F control unit 604 and external I/F 603.

In step S710, the self-tuner receives the TS after the RF shift from the remote tuner via the external I/F 113 and external I/F control unit 112 in FIG. 5, and provides the received TS as the signal D6 to the first stream switching unit 102. The first stream switching unit 102 switches the TS to be sent as the signal D9 to the first demultiplexer 103 from the signal D8 to the signal D6. That is, the first stream switching unit 102 switches the state "D8→D9, D8→D7" to the state "D6→D9, D8→D7". In step S711, the first demultiplexer 103 extracts the PAT multiplexed on the received TS, and sends it out as the signal D2 to the system control unit 111. In step S712, the system control unit 111 analyzes the PID value of the PMT described in the PAT. In step S713, the system control unit 111 receives the PMT multiplexed on the received TS via the first demultiplexer 103 in accordance with the PID value obtained as a result of the analysis in step S712. In step S714, the system control unit 111 analyzes the PID value of a program on the desired channel described in the PMT.

In step S715, the first demultiplexer 103 extracts a TS packet having the PID value of the program on the desired channel multiplexed on the TS received from the remote tuner 602 in FIG. 5 in accordance with the PID value obtained as a result of the above analysis, and sends out the packet as the signal D1 to the second stream switching unit 104. In step S716, the second stream switching unit 104 selects the signal D1 from the first demultiplexer 103 and sends it out to the decoder 105, thereby displaying a picture.

Meanwhile, the TS of the program with channel number 2 which is being recorded is kept recorded on the storage 110 via the first stream switching unit 102, second demultiplexer 108, and recording control unit 109 (D8→D7→D3) because the reception RF of the tuner unit 101 is not changed.

Note that the tuner unit 101 and external I/F control unit 112 have buffer memories each capable of storing a TS corresponding to a predetermined interval, e.g., several sec to several ten sec, and the first stream switching unit 102 selectively reads out and outputs the signals D8 and D6 at predetermined timings. In this case, each of the signals D6 and D8 is read out at a rate several times higher than that in input operation.

As described above, the digital TV broadcast receiving apparatus (self-tuner) with the digital broadcast signal recording function according to this embodiment includes the external I/F for performing bus connection or network connection to other digital TV broadcast receiving apparatuses (other tuners). This apparatus can receive the NITs received by other tuners via this external I/F and analyze them. This arrangement allows the self-tuner to check whether there is any remote tuner which can receive an RF containing the TS packets of a program on a channel which is to be displayed in real time and, if there is such a tuner, receive TS data containing the TS packets of the program on the desired channel from that one remote tuner, which can receive the RF containing those TS packets, via the external I/F. Therefore, with regard to programs on two channels which are modulated with different RFs and transmitted, this apparatus can obtain the program on one channel from a remote tuner and display it in real time while obtaining the program on the other channel via the tuner unit in the self-tuner and recording it.

Obviously, the above self-tuner can also serve as a remote tuner like the one described above. In this case, this apparatus executes processing such as transmitting the NIT received by the tuner unit 101 in accordance with the NIT request received via the external I/F 113. When a TS request is received from an external tuner via the external I/F 113 and external I/F control unit 112 (a TS request is generated when an external tuner executes step S709), the transport stream (signal D8) generated by the tuner unit 101 is transmitted via the units 112 and 113.

Figure 10:
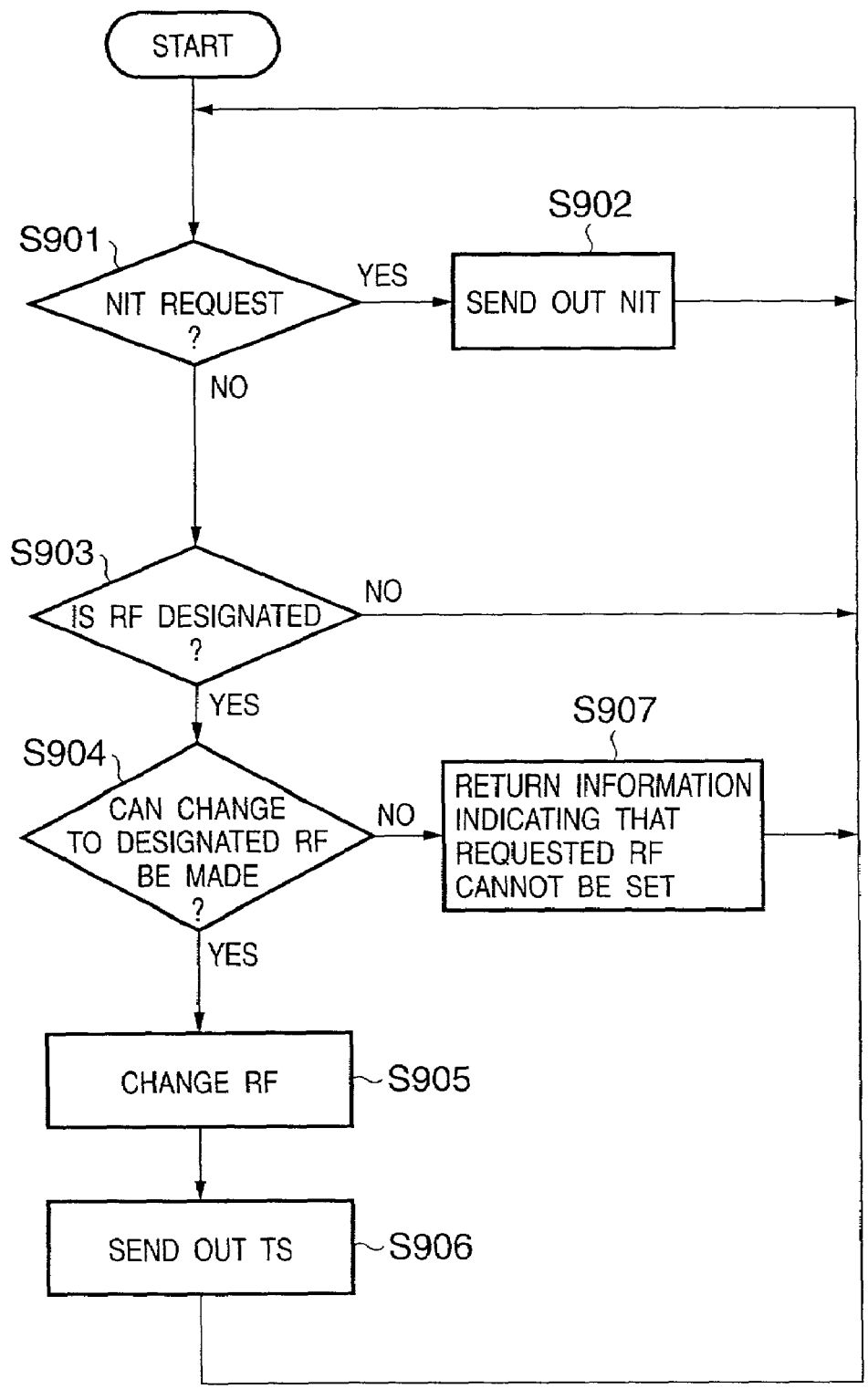
FIG. 10 is a flow chart showing processing to be performed when the tuner shown in FIG. 1 serves as a remote tuner.

FIG. 10 is a view showing a case where the tuner shown in FIG. 1 operates as the remote tuner described above.

When the NIT request issued in step S704 is received via the external I/F 113 and external I/F control unit 112, the flow advances from step S901 to step S902 to return the self-NIT to the request source.

When the RF change request issued in step S707 is received, the flow advances from step S903 to step S904 to check whether a change to the designated RF can be made. If NO in step S904, the flow advances from step S904 to step S907 to notify the request source that the requested RF cannot be set.

If YES in step S904, the flow advances to step S905 to set the designated RF. In step S906, the TS received over the RF is sent to the request source. Note that if the current received RF coincides with the requested RF, the flow advances from step S904 to step S906.

As described above, according to the above embodiment, one of at least two programs modulated with different frequencies can be watched while the other program is recorded by using the tuner of a remote digital broadcast receiving apparatus.

Obviously, one TS packet to be displayed in real time may be obtained from the tuner unit of the self-tuner, and the other TS packet may be obtained from a remote tuner via an external I/F. Operation in this case will be described in further detail below.

Assume that channel numbers 1 to 4 are multiplexed on the same modulation frequency (RF1), and channel numbers 5 to 8 are multiplexed on a modulation frequency (RF2) different from that for channel numbers 1 to 4. Assume also that in the self-tuner 601, the user is currently displaying (watching) a program with channel number 1 while recording a program with channel number 2, and has given an instruction to change the current program to a program with channel number 5 to be recorded.

In step S701 in FIG. 6, the user gives an instruction to record the program with channel number 5 to the system control unit 111 by operating the operation unit 114 such as the remote controller in FIG. 1 with which the self-tuner is equipped. In step S702, the self-tuner 601 receives the PAT multiplexed on the currently received RF1 via the tuner unit 101, first stream switching unit 102, and first demultiplexer 103. At this point of time, the first stream switching unit 102 selects the signal D8 as the TS from the tuner unit 101 and sends it out as a signal D7 to the second demultiplexer 108 (D7 in FIG. 1).

In step S703, it is checked from the received PAT whether the desired channel is present in the currently received RF1. In a channel change pattern other than that described in this embodiment, e.g., a change from channel number 2 to channel number 4, since these channels exist in the same RF1, the flow advances from step S703 to step S719. The Extraction processing for a packet for recording is performed in steps S719 to S721. In step S722, the packet is displayed or recorded.

In this embodiment, as described above, the program with channel number 2 multiplexed on the RF1 is currently recorded, and channel number 5 to which the current channel is to be changed is multiplexed on the RF2 but is not present in the RF1. The flow therefore advances from step S703 to step S704. The self-tuner 601 requests the other tuners 602, 606, and 607, connected to the connection bus 608, via the system control unit 111, external I/F control unit 112, and external I/F 113 to transmit the NITs received by the respective tuners to the self-tuner. This request is simultaneously sent to the other tuners 602, 606, and 607 via the connection bus 608. In accordance with this request, each of the other tuners 602, 606, and 607 sends out the received NIT to the self-tuner 601 via the system control unit 605, external I/F control unit 604, and external I/F 603.

In step S705, the system control unit 111 of the self-tuner analyzes the respective NITs received from the other tuners to search for an RF on which desired channel number 5 is multiplexed. This search processing is the same as that described with reference to FIG. 7.

In step S706, the processing result in step S705 is received to check whether there are any other tuners which can receive the RF on which the desired channel is multiplexed. If NO in step S706, it is determined that the change to channel number 5 cannot be made. The processing is then terminated. If YES in step S706, the self-tuner sends a request to shift to that RF to a remote tuner (in this embodiment, the remote tuner 602 in FIG. 5), which has transmitted the NIT in which the RF is present, via the external I/F control unit 112 and external I/F 113 in step S707.

Upon reception of this request, the remote tuner 602 checks in its system control unit 605 whether a shift to the requested RF can be made. If this shift can be made, the remote tuner 602 notifies the self-tuner 601 via the external I/F control unit 604 and external I/F 603 that the shift can be made. If the shift to the RF cannot be made in the remote tuner 602 as in a case where a program on a channel multiplexed on an RF other than the requested RF is being watched, the remote tuner 602 notifies the self-tuner 601 that the shift cannot be made.

In step S708, the self-tuner 601 checks in the system control unit 111 in accordance with the notification from the remote tuner described above whether the remote tuner 602 can shift to the RF. If NO in step S708, the processing is terminated. If YES in step S708, the system control unit 111 in the self-tuner 601 sends a request for a TS after the RF shift to the remote tuner 602. In accordance with the request from the self-tuner 601, the remote tuner 602 changes the reception RF, and transmits the TS on the request RF via the external I/F control unit 604 and external I/F 603.

In step S710, the self-tuner receives the TS after the RF shift from the remote tuner 602 via the external I/F 113 and external I/F control unit 112, and sends out the received TS as the signal D6 to the first stream switching unit 102. The first stream switching unit 102 switches the TS (signal D7) to be sent to the second demultiplexer 108 from the signal D8 to the signal D6. That is, the first stream switching unit 102 switches the state "D8→D9, D8→D7" to the state "D8→D9, D6→D7". In step S711, the second demultiplexer 108 extracts the PAT multiplexed on the received TS, and sends it out as the signal D4 to the system control unit 111. In step S712, the system control unit 111 analyzes the PID value of the PMT described in the PAT. In step S713, the system control unit 111 receives the PMT multiplexed on the received TS via the second demultiplexer 108 in accordance with the PID value obtained as a result of the analysis described above. In step S714, the system control unit 111 analyzes the PID value of a program on the desired channel described in the PMT. In step S715, the second demultiplexer 108 extracts a TS packet having the PID value of the program on the desired channel multiplexed on the TS received from the remote tuner 602 in accordance with the PID value obtained as a result of the above analysis, and sends out the packet as the signal D3 to the recording control unit 109. In step S716, the recording control unit 109 controls the storage 110 to record the data.

Since the tuner unit 101 in FIG. 1 has not changed the reception RF, the TS of a program on channel number 1 which is being displayed in real time is sent out to the decoder 105 via the first stream switching unit 102, first demultiplexer 103, and second stream switching unit 104 (D8→D9→D1). After the TS is decoded, the resultant data is sent out to the image display unit 107 via the display control unit 106 to keep display operation.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiment to a system or apparatus, and causing the computer (or a CPU or an MPU) of the system or apparatus to read out and execute the program codes stored in the storage medium. In this case, the program codes read out from the storage medium realize the functions of the above-described embodiment by themselves, and the storage medium storing the program codes constitutes the present invention. The functions of the above-described embodiment are realized not only when the readout program codes are executed by the computer but also when the OS (Operating System)

running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, a digital broadcast receiving apparatus can use the tuners of other digital broadcast receiving apparatuses, and hence allows the user to watch one of at least two programs modulated with different frequencies in real time while recording the other program.

As many apparently widely different embodiments of the present invention can be made without departing from the spirit and scope thereof, it is to be understood that the invention is not limited to the specific embodiments thereof except as defined in the claims.

What is claimed is:

1. A digital broadcast receiving apparatus comprising:
generating means for receiving a digital broadcast and generating a data stream from a digital broadcast signal having a desired modulation frequency;
input means for inputting a data stream based on a digital broadcast from an external digital broadcast receiving apparatus;
playback means for playing back a content of a channel contained in one of the data streams obtained by said generating means and input means; and
storage means for storing a content of a channel contained in the data stream other than the data stream to be played back by said playback means in a data storage medium,
wherein said input means comprises:
acquisition means for acquiring a channel information indicative of a channel that can be received by the external digital broadcast receiving apparatus from the external digital broadcast receiving apparatus, and
determination means for determining on the basis of the channel information acquired by said acquisition means whether the external digital broadcast receiving apparatus can receive a digital broadcast signal containing a desired channel, and
inputs the data stream from the external digital broadcast receiving apparatus that is determined by said determination means as an apparatus capable of receiving the desired channel.

2. The apparatus according to claim 1, wherein said acquisition means and determination means are executed with respect to a plurality of external digital broadcast receiving apparatuses, which are connected via said input means to be able to input data streams, in order to find an external digital broadcast receiving apparatus that can receive the desired channel.

3. The apparatus according to claim 1, wherein
said acquisition means receives and acquires an NIT (Network Information Table) defined in the IEC 13818-1 MPEG2 SYSTEM from the external digital broadcast receiving apparatus, and
said determination means analyzes the NIT acquired by said acquisition means to determine whether the external digital broadcast receiving apparatus can receive a desired channel.

4. The apparatus according to claim 3, wherein said determination means comprises:
first determination means for determining whether the desired channel is contained in the NIT acquired by said acquisition means; and
second determination means for, when said first determination means determines that the desired channel is contained, inquiring of the external digital broadcast receiving apparatus whether the apparatus can execute reception of a digital broadcast signal containing the desired channel, thereby determining whether the desired channel can be received.

5. A digital broadcast receiving apparatus having generating means for receiving a digital broadcast and generating a data stream from a digital broadcast signal having a desired modulation frequency, comprising:
notification means for notifying information of a channel that can be received in accordance with a request from an external digital broadcast receiving apparatus;
control means for controlling said generating means in accordance with a request from the external digital broadcast receiving apparatus so as to generate a data stream from a digital broadcast signal having a modulation frequency containing a designated channel; and
output means for outputting the data stream containing the designated channel, generated by said generating meals, to the external digital broadcast receiving apparatus.

6. The apparatus according to claim 5, wherein said notification means provides an NIT (Network Information Table) defined in the IEC 13818-1 MPEG2 SYSTEM to the external digital broadcast receiving apparatus in accordance with a request from the external digital broadcast receiving apparatus.

7. The apparatus according to claim 5, wherein said input means includes a network connection or bus connection to the external digital broadcast receiving apparatus.

8. A digital broadcast receiving system in which a plurality of digital broadcast receiving apparatuses are connected to each other via communication means so as to be able to communicate with each other, comprising:
generating means for receiving a digital broadcast and generating a data stream from a digital broadcast signal having a desired modulation frequency in a first digital broadcast receiving apparatus;
input means for allowing the first digital broadcast receiving apparatus to input a data stream based on a digital broadcast from an external digital broadcast receiving apparatus via the communication means;
playback means for allowing the first digital broadcast receiving apparatus to play back in real time a content of a channel contained in one of the data streams respectively obtained by said generating means and input means; and
storage means for allowing the first digital broadcast receiving apparatus to store in a data storage medium a content of a channel contained in the data stream other than the data stream to be played back by said playback means,
wherein said input means comprises:
acquisition means for acquiring information of a channel that can be received from an external digital broadcast receiving apparatus via the communication means, and
determination means for determining on the basis of the information of the channel acquired by said acquisition means whether the external digital broadcast receiving apparatus can receive a digital broadcast signal containing a desired channel, and inputs the data stream from the external digital broadcast receiving apparatus that is determined by said determination means as an apparatus capable of receiving the desired channel.

9. The system according to claim 8, wherein said acquisition means and determination means are executed with respect to a plurality of external digital broadcast receiving apparatuses, which are connected via the communication means, in order to find an external digital broadcast receiving apparatus that can receive the desired channel.

10. The system according to claim 8, wherein said acquisition means receives and acquires an NIT (Network Information Table) defined in the IEC 13818-1 MPEG2 SYSTEM from the external digital broadcast receiving apparatus, and said determination means analyzes the NIT acquired by said acquisition means to determine whether the external digital broadcast receiving apparatus can receive a desired channel.

11. The system according to claim 10, wherein said determination means comprises:

first determination means for determining whether the desired channel is contained in the NIT acquired by said acquisition means; and second determination means for, when said first determination means determines that the desired channel is contained, inquiring of the external digital broadcast receiving apparatus whether the apparatus can execute reception of a digital broadcast signal containing the desired channel, thereby determining whether the desired channel can be received.

12. A control method for a digital broadcast receiving apparatus having a generating step of receiving a digital broadcast and generating a data stream from a digital broadcast signal having a desired modulation frequency, comprising:

a notification step of notifying information of a channel that can be received in accordance with a request from an external digital broadcast receiving apparatus;

a control step of controlling the generating step in accordance with a request from the external digital broadcast receiving apparatus so as to generate a data stream from a digital broadcast signal having a modulation frequency containing a designated channel; and an output step of outputting the data stream containing the designated channel, generated in the generating step, to the external digital broadcast receiving apparatus.

13. A receiving apparatus comprising:

reception means for receiving a digital broadcast signal and generating a first data stream in accordance with the digital broadcast signal;

input means for inputting a second data stream from an external receiving apparatus;

selection means for selectively outputting the first data stream generated by said receiving means and the second data stream input by said input means; and control means for detecting a channel that can be received by the external receiving apparatus and controlling selecting operation of said selection means in accordance with the detection result.

14. The apparatus according to claim 13, wherein said apparatus comprises instruction means for designating a channel, and said control means controls selecting operation of said selection means in accordance with the channel designated by said instruction means and the detection result.

15. The apparatus according to claim 14, wherein said reception means controls selecting operation of said selection means in accordance with a first determination result obtained by determining whether the designated channel is contained in a digital broadcast signal received by said reception means, and a second determination result obtained by determining whether the designated channel is contained in a channel that can be received by the external receiving apparatus.

16. The apparatus according to claim 14, wherein said control means determines whether the designated channel is contained in a channel that can be received by the external receiving apparatus, and if the designated channel is contained, said control means controls said selection means so that said selection means alternately outputs the first data stream obtained from the digital broadcast signal received by said reception means and the second data stream input from said input means and containing the designated channel.

17. The apparatus according to claim 14, wherein said control means determines whether the designated channel is contained in a channel that can be received by the external receiving apparatus, and if the designated channel is not contained, controls said selection means so as to output only the first data stream obtained from the digital broadcast signal received by said reception means.

18. The apparatus according to claim 13, wherein said detection means receives an NIT (Network Information Table) defined in the IEC 13818-1 MPEG2 SYSTEM, and detects a channel that can be received by the external receiving apparatus on the basis of the received NIT.

19. The apparatus according to claim 13, further comprising recording means for recording a data stream output from said selection means, and display means for displaying an image based on the data stream output from said selection means.

20. The apparatus according to claim 19, wherein said apparatus comprises instruction means for designating a channel to be displayed on said display means, and said detection means detects a channel that can be received by the external receiving apparatus in accordance with an instruction from said instruction means during recording of the first data stream by said recording means.

21. The apparatus according to claim 19, wherein said apparatus comprises instruction means for designating a channel to be recorded by said recording means, and said detection means detects a channel that can be received byte external receiving apparatus in accordance with an instruction from said instruction means during display of an image on a desired channel in the first data stream by said display means.

22. The apparatus according to claim 13, further comprising instruction means for designating a recording channel to be recorded by said recording means and a display channel to be displayed by said display means, and extraction means fox extracting a data stream on the recording channel from a data stream output from said selection means to output the extracted data stream to said recording means and also extracting a data stream on the display channel to output the extracted data stream to said display means in accordance with an instruction from said instruction means.

* * * * *

UNITED STATES PATENT AND TRADEMARK OFFICE
CERTIFICATE OF CORRECTION

PATENT NO. : 6,961,511 B2 Page 1 of 1
APPLICATION NO. : 09/817343
DATED : November 1, 2005
INVENTOR(S) : Ohno et al.

It is certified that error appears in the above-identified patent and that said Letters Patent is hereby corrected as shown below:

COLUMN 1:
Line 24, "are" should read -- is --.

COLUMN 8:
Line 2, "NITS" should read -- NITs --; and
Line 56, "indicting" should read -- indicating --.

COLUMN 14:
Line 27, "meals," should read -- means, --.

COLUMN 16:
Line 50, "byte" should read -- by the --.

Signed and Sealed this

Fifth Day of December, 2006

JON W. DUDAS
*Director of the United States Patent and Trademark Office*